(12) United States Patent
Kim et al.

(10) Patent No.: US 9,897,887 B2
(45) Date of Patent: Feb. 20, 2018

(54) ELECTROCHROMIC DEVICE CAPABLE OF PREVENTING DAMAGE OF ELECTRODE

(71) Applicant: ELECTRONICS AND TELECOMMUNICATIONS RESEARCH INSTITUTE, Daejeon (KR)

(72) Inventors: Joo Yeon Kim, Daejeon (KR); Hojun Ryu, Seoul (KR); Sang Hoon Cheon, Daejeon (KR); Seong-Mok Cho, Daejeon (KR); Ji-Young Oh, Daejeon (KR); Tae-Youb Kim, Daejeon (KR); Chil Seong Ah, Daejeon (KR); Yong Hae Kim, Daejeon (KR); Jeong Ik Lee, Daejeon (KR); Nam Sung Cho, Daejeon (KR); Chi-Sun Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/234,323

(22) Filed: Aug. 11, 2016

(65) Prior Publication Data
US 2017/0219902 A1 Aug. 3, 2017

(30) Foreign Application Priority Data
Jan. 28, 2016 (KR) .......................... 10-2016-0010766

(51) Int. Cl.
G02F 1/155 (2006.01)
G02F 1/153 (2006.01)

(52) U.S. Cl.
CPC ............ G02F 1/1533 (2013.01); G02F 1/155 (2013.01); *G02F 2001/1536* (2013.01)

(58) Field of Classification Search
CPC .......... G02F 1/15; G02F 1/1506; G02F 1/157; G02F 1/161; G02F 2001/151; G02F 2001/1512; G02F 2001/1515; G02F 2001/1517; G02F 2001/1519;
(Continued)

(56) References Cited

U.S. PATENT DOCUMENTS

| 2012/0147448 A1* | 6/2012 | Yaniv | G02F 1/155 |
| | | | 359/265 |
| 2013/0010347 A1* | 1/2013 | Tajima | C03C 17/36 |
| | | | 359/270 |

(Continued)

FOREIGN PATENT DOCUMENTS

KR 10-2014-0086327 A 7/2014

*Primary Examiner* — William Choi

(57) ABSTRACT

Provided is an electrochromic device, which may prevent a damage of an electrode and include a lower substrate and an upper substrate configured to face each other with an electrolyte layer therebetween, an upper electrode provided between the electrolyte layer and the upper substrate, a lower electrode provided between the electrolyte layer and the lower substrate, an upper ion reactive layer provided between the upper electrode and the electrolyte layer, and a lower protection layer provided between the lower electrode and the electrolyte layer and configured to prohibit the lower electrode and the electrolyte layer from contacting.

19 Claims, 8 Drawing Sheets

(58) Field of Classification Search
CPC ..... G02F 2001/1552; G02F 2001/1555; G02F 2001/1557
USPC ................................................ 359/265–275
See application file for complete search history.

(56) References Cited

U.S. PATENT DOCUMENTS

2014/0144501 A1  5/2014  Jung et al.
2015/0185580 A1  7/2015  Cho et al.

\* cited by examiner (Coloring)

(Decoloring)

ELECTROCHROMIC DEVICE CAPABLE OF PREVENTING DAMAGE OF ELECTRODE

CROSS-REFERENCE TO RELATED APPLICATION

This U.S. non-provisional patent application claims priority under 35 U.S.C. § 119 of Korean Patent Application No. 10-2016-0010766, filed on Jan. 28, 2016, the entire contents of which are hereby incorporated by reference.

BACKGROUND

The present disclosure herein relates to an electrochromic device, and more particularly, to an electrochromic device capable of preventing a damage of an electrode.

An electrochromic device is a device having a characteristic that a color or transmissivity varies due to a reduction-oxidation reaction according to voltage application. Generally, an electrochromic device has a structure in which electrodes and electrolytes come into contact. Due to such contacts of the electrodes and the electrolytes, limitations may occur in that the electrodes are damaged or the electrodes are detached from substrates. Accordingly, an improved structure of an electrochromic device is required which is stable and reliable by addressing the damage or detachment phenomenon of the electrodes.

SUMMARY

The present disclosure provides an electrochromic device capable of reversibly decolorizing and coloring by an oxidation-reduction reaction.

The present disclosure also provides an electrochromic device which adopts graphene as a transparent electrode material.

The present disclosure also provides an electrochromic device capable of preventing a damage of an electrode.

An embodiment of the inventive concept provides an electrochromic device including: a lower substrate and an upper substrate configured to face each other with an electrolyte layer therebetween; an upper electrode provided between the electrolyte layer and the upper substrate; a lower electrode provided between the electrolyte layer and the lower substrate; an upper ion reactive layer provided between the upper electrode and the electrolyte layer; and a lower protection layer provided between the lower electrode and the electrolyte layer and configured to prohibit the lower electrode and the electrolyte layer from contacting.

In an embodiment, the lower protection layer may include a porous or membrane structure through which charges are movable between the electrolyte and the lower electrode.

In an embodiment, the lower protection layer may include an inorganic material, an organic material, an oligomer, or a polymer.

In an embodiment, the electrochromic device may further include at least any one of an upper buffer layer and an upper protection layer provided between the upper ion reactive layer and the electrolyte layer.

In an embodiment, the upper protection layer may be adjacent to the electrolyte layer and the upper buffer layer may be provided between the upper ion reactive layer and the upper protection layer.

In an embodiment, the upper protection layer may include a porous or membrane structure through which charges are movable between the electrolyte layer and the upper electrode.

In an embodiment, the upper buffer layer may include graphene having a single layer or multi-layer structure.

In an embodiment, the electrochromic device may further include at least any one of a lower buffer layer and a lower ion reactive layer provided between the lower electrode and the lower protection layer.

In an embodiment, the lower ion reactive layer may be provided on the lower substrate and the lower buffer layer may be provided between the lower ion reactive layer and the lower protection layer.

In an embodiment, the lower buffer layer may include graphene having a single layer or multi-layer structure.

In an embodiment, the electrochromic device may further include: at least any one of an upper buffer layer and an upper protection layer provided between the upper ion reactive layer and the electrolyte layer; and at least any one of a lower buffer layer and a lower ion reactive layer provided between the lower electrode and the lower protection layer.

In an embodiment of the inventive concept, an electrochromic device includes: an upper transparent substrate and lower transparent substrate facing each other; an electrolyte layer provided between the upper transparent substrate and the lower transparent substrate; a lower graphene electrode provided between the electrolyte layer and the lower transparent substrate; an upper graphene electrode provided between the electrolyte layer and the upper transparent substrate; an upper ion reactive layer provided between the upper graphene electrode and the electrolyte layer; and a lower protection layer provided between the lower graphene electrode and the electrolyte layer and configured to separate the lower graphene electrode from the electrolyte layer.

In an embodiment, the electrochromic device may further include: an upper buffer layer and an upper protection layer provided between the electrolyte layer and the upper transparent substrate, wherein the upper buffer layer is provided between the electrolyte layer and the upper ion reactive layer, and the upper protection layer is provided between the electrolyte layer and the upper buffer layer.

In an embodiment, the electrochromic device may further include: a lower buffer layer and a lower ion reactive layer provided between the electrolyte layer and the lower transparent substrate, wherein the lower buffer layer is provided between the electrolyte layer and the lower ion reactive layer and the lower ion reactive layer is provided between the lower buffer layer and the lower transparent substrate.

In an embodiment, the electrochromic device may further include: an upper buffer layer and an upper protection layer provided between the upper ion reactive layer and the electrolyte layer; and a lower buffer layer and a lower ion reactive layer provided between the lower graphene electrode and the lower protection layer.

In an embodiment, the lower graphene electrode, the lower ion reactive layer, the lower buffer layer, and the lower protection layer may be sequentially stacked on the lower transparent substrate along a direction from the lower transparent substrate toward the electrolyte layer, and wherein the upper graphene electrode, the upper ion reactive layer, the upper buffer layer, and the upper protection layer are sequentially stacked on the upper transparent substrate along a direction from the upper transparent substrate toward the electrolyte layer.

In an embodiment of the inventive concept, an electrochromic device includes: lower and upper transparent substrates configured to face each other with an electrolyte layer therebetween; a lower transparent electrode provided on the lower transparent substrate; an upper transparent electrode provided on the upper transparent substrate; an upper ion reactive layer provided on the upper transparent electrode and adjacent to the electrolyte layer; and a lower protection layer provided on the lower transparent electrode and adjacent to the electrolyte layer, wherein the lower protection layer includes a porous membrane provided between the lower transparent electrode and the electrolyte layer and configured to separate the lower transparent electrode from the electrolyte layer.

In an embodiment, the electrochromic device may further include: an upper buffer layer and an upper protection layer provided between the lower transparent substrate and the electrolyte layer, wherein the upper protection layer may include a porous membrane provided between the upper buffer layer and the electrolyte layer, and the upper buffer layer may include graphene provided between the upper protection layer and the upper ion reactive layer.

In an embodiment, the electrochromic device may further include: a lower buffer layer and a lower ion reactive layer provided between the lower transparent substrate and the electrolyte layer, wherein the lower protection layer may include a porous membrane provided between the lower buffer layer and the electrolyte layer, and the lower ion reactive layer is provided between the lower protection layer and the lower transparent substrate.

In an embodiment, the electrochromic device may further include: an upper buffer layer and an upper protection layer provided between the upper transparent layer and the electrolyte layer; and a lower buffer layer and a lower ion reactive layer provided between the lower transparent substrate and the electrolyte layer, wherein the upper protection layer may include a porous membrane provided between the upper buffer layer and the electrolyte layer and the upper buffer layer may include graphene provided between the upper protection layer and the upper ion reactive layer, and wherein the lower protection layer may include a porous membrane provided between the lower buffer layer and the electrolyte layer, and the lower ion reactive layer is provided between the lower protection layer and the lower transparent substrate.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
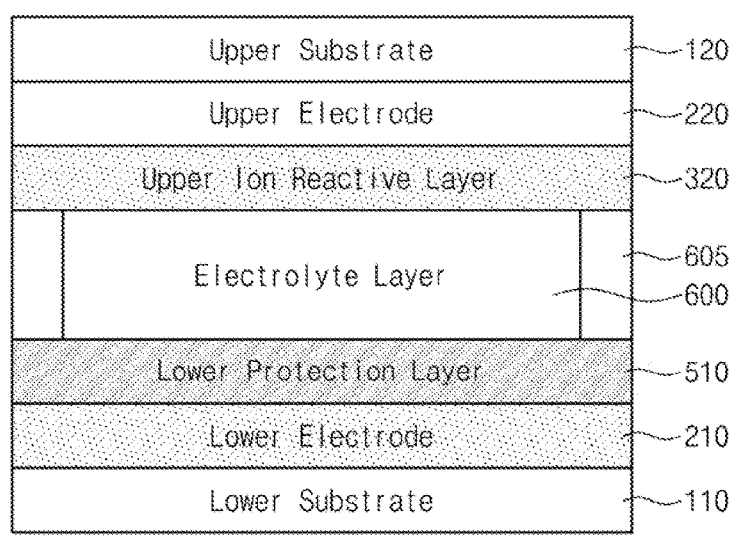
FIG. 1 is a cross-sectional view of an electrochromic device according to an embodiment of the inventive concept.

Hereinafter an electrochromic device capable of preventing a damage of an electrode will be described in detail with reference to the accompanying drawings.

Advantages of the inventive concept in comparison with the related art will be clarified through the following detailed description with reference to the accompanying drawings and claims. In particular, the inventive concept is well pointed out and clearly claimed in claims. However, the inventive concept will be best appreciated by referring to the following description in relation to the accompanying drawings. In the drawings, like reference numerals refer to like elements throughout.

<Example of an Electrochromic Device>

FIG. 1 is a cross-sectional view of an electrochromic device according to an embodiment of the inventive concept.

Referring to FIG. 1, an electrochromic device 1 may include a lower substrate 110 and an upper substrate 120 facing each other with an electrolyte layer 600 therebetween, a lower electrode 210 provided between the lower substrate 110 and the electrolyte layer 600, an upper ion reactive layer 320 provided between the upper electrode 220 and the electrolyte layer 600, and a spacer 605 encapsulating the electrolyte layer 600. The electrochromic device 1 may be adopted in various fields such as an optical shutter, a reflective display, a room mirror or side mirror for vehicle, a sign, a smart window, or the like.

In the present specification, the terms "upper" and "lower" are reversible. For example, when the electrochromic device 1 is upside down, the upper substrate 120 may be referred to as a lower substrate and the lower substrate 110 may be referred to as an upper substrate. Similarly, the upper electrode 220 may be referred to as a lower electrode and the lower electrode 210 may be referred to as an upper electrode.

At least one of the lower and upper substrates 110 and 120 may include an inorganic material, an organic material, a polymer, or a combination thereof, and have a characteristic of transparency, flexibility, stretchability, or a combination thereof. As an example, the lower and upper substrates 110 and 120 may include a flexible and transparent polymer.

At least one of the lower and upper electrodes 210 and 220 may include a transparent and conductive material. At least one of the lower and upper electrodes 210 and 220 may include transparent conducting oxide (TCO), such as indium tin oxide (ITO), or graphene. As an example, the lower and upper electrodes 210 and 220 may include graphene having a single layer structure or a multi-layer structure.

The upper ion reactive layer 320 may include an oxidation coloring material or a reduction coloring material with which coloring and decolorizing may reversibly occur by an oxidation-reduction reaction. The reduction coloring material may include viologen, polyisothianaphthene, $WO_3$, $TiO_2$, $ZnO$, $V_2O_5$, $Nb_2O_5$, $MoO_2$, or the like. The oxidation coloring material may include polypyrrole, polythiophene, $Ir(OH)_x$, $Ni(OH)_2$, $Rh_2O_3$, $NiO_2$, $FeO_2$, $MnO_2$, $Cr_2O_5$, $CoO2$, $SbO_2$, or $SnO_2$. As an example, the upper ion reactive layer 320 may include a reduction coloring material such as viologen-anchored $TiO_2$ in which viologen is anchored on $TiO_2$ or the surface of $TiO_2$. As another example, the upper ion reactive layer 320 may include an oxidation coloring material such as $SnO_2$ or Sb-doped $SnO_2$.

The electrolyte layer 600 may include a solution in which a salt such as a lithium salt, a potassium salt, a sodium salt, or an ammonium salt is dissolved in an aqueous solvent or an organic solvent. The electrolyte layer 600 may be in a liquid, solid, or gel state. As an example, the electrolyte layer 600 may include a lithium salt.

According to an embodiment of the inventive concept, the electrochromic device 1 may further include a lower protection layer 510 provided between the electrolyte layer 600 and the lower electrode 210. The lower protection layer 510 may separate the lower electrode 210 from the electrolyte layer 600 to prevent the lower electrode 210 and the electrolyte layer 600 from directly contacting each other. Since the lower protection layer 510 prevents the lower electrode 210 and the electrolyte 600 from directly contacting each other, a damage of the lower electrode 210 according to the direct contact to the electrolyte layer 600, abnormal penetration of ions inside the electrolyte layer 600 into the lower electrode 210, and a gap between graphene layers configuring the lower electrode 210 or detachment of the lower electrode 210 from the lower substrate 110 according to the damage or the abnormal penetration, may be prevented.

The lower protection layer 510 may be a porous membrane having a structure in which smooth exchange of ions, electrons, or holes may occur between the electrolyte layer 600 and the lower electrode 210. For example, the lower protection layer 510 may include a membrane or a polymer having a porous structure such as an inorganic material, an organic material, an organic-inorganic composition, or an oligomer. According to an example, the lower protection layer 510 may include a porous membrane, such as $TiO_2$, $SnO_2$, Sb—$SnO_2$, Nafion available from Dupont, Flemion available from Asahi Glass, or a combination thereof.

<Operation Example of an Electrochromic Device>

Figure 2A:
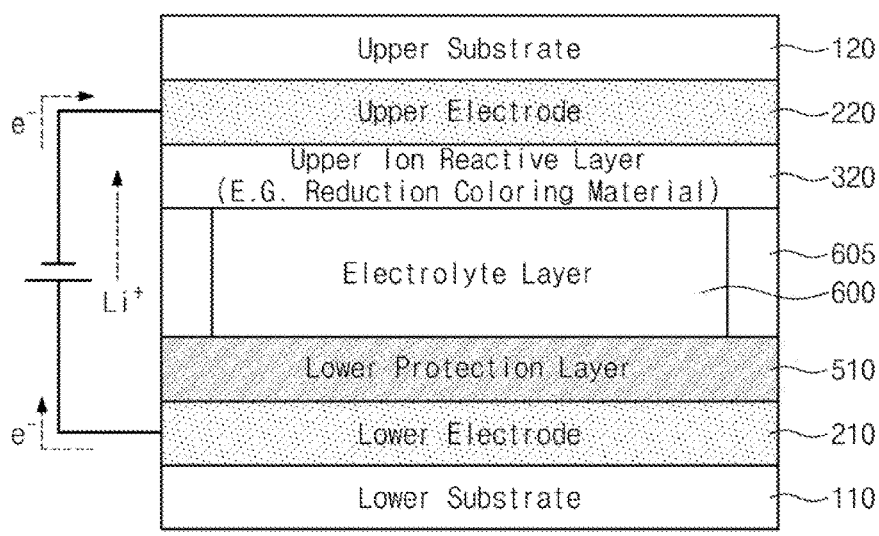
FIG. 2A is a cross-sectional view of a coloring operation of the electrochromic device of FIG. 1.
Figure 2B:
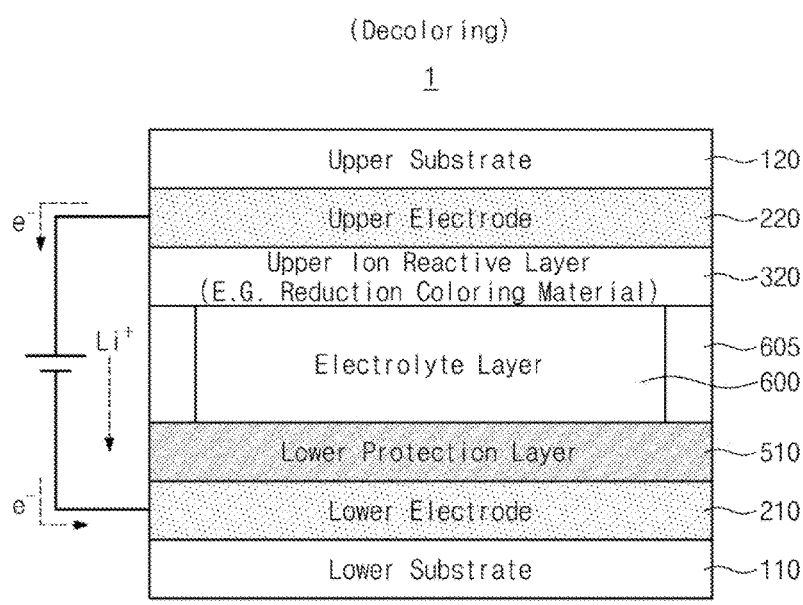
FIG. 2B is a cross-sectional view of a decolorizing operation of the electrochromic device of FIG. 1.

FIG. 2A is a cross-sectional view of a coloring operation of the electrochromic device of FIG. 1. FIG. 2B is a cross-sectional view of a decolorizing operation of the electrochromic device of FIG. 1.

Referring to FIG. 2A, when an upper ion reaction layer 320 of the electrochromic device 1 includes a reduction coloring material such as viologen or viologen-anchored $TiO_2$, the electrochromic device 1 may become colored or dark if an electric potential difference occurs between the upper electrode 220 and the lower electrode 210. For example, when a first voltage (e.g. a positive voltage) is applied to the lower electrode 210 and a second voltage (e.g. a negative voltage) lower than the first voltage is applied to the upper electrode 220, a reduction reaction from which electrons or ions (e.g. Li+) are obtained may occur in the upper ion reaction layer 320. The electrochromic device 1 may represent a specific color due to the reduction reaction.

Referring to FIG. 2, when a first voltage (e.g. a positive voltage) is applied to the upper electrode 220 of the electrochromic device 1 in the colored state and a second voltage (e.g. a negative voltage) smaller than the first voltage is applied to the lower electrode 210, an oxidation reaction in which electrons or ions (e.g. Li+) are lost may occur in the upper ion reaction layer 320. The electrochromic device 1 may become decolorized or transparent by the oxidation reaction.

For another example, when the upper ion reaction layer 320 includes an oxidation coloring material, such as $SnO_2$ or Sb-doped $SnO_2$, the discoloration of the electrochromic device 1 may be opposite to the above-described case. For example, the electrochromic device 1 including the oxidation coloring material may become decolorized or transparent under a voltage application condition as illustrated in FIG. 2A, and may become colored or dark under a voltage application condition as illustrated in FIG. 2B.

<Another Examples of an Electrochromic Device>

Figure 3:
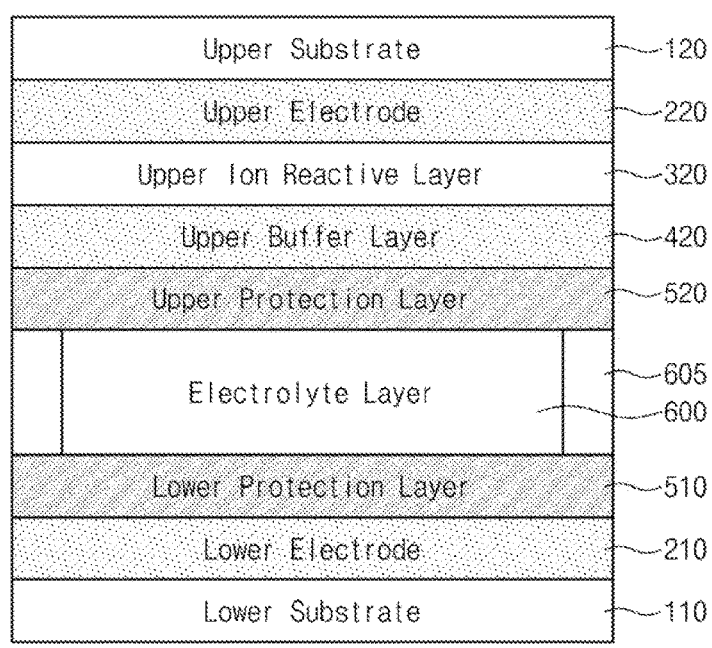
FIG. 3 is a cross-sectional view of an electrochromic device according to another embodiment of the inventive concept.

FIG. 3 is a cross-sectional view of an electrochromic device according to another embodiment of the inventive concept. Hereinafter, since the device of FIG. 3 is similar to that of FIG. 1, the same points will be omitted or briefly explained, or differences will be explained in detail.

Referring to FIG. 3, identically or similarly to the electrochromic device 1 of FIG. 1, the electrochromic device 2 may include the lower electrode 210 and the lower protection layer 510 between the electrolyte layer 600 and the lower substrate 110, and may include the upper electrode 220 and the upper ion reactive layer 320 between the electrolyte layer 600 and the upper substrate 120.

The electrochromic device 2 may further include at least any one of an upper buffer layer 420 and an upper protection layer 520 between the upper ion reactive layer 320 and the electrolyte layer 600. The upper protection layer 520 may be adjacent to the electrolyte layer 600, and the upper buffer layer 420 may be provided adjacent to the upper ion reactive layer 320 between the upper ion reactive layer 320 and the upper protection layer 520.

The upper protection layer 520 may have a structure identical or similar to the lower protection layer 510. For example, the upper protection layer 520 may include a membrane through which charges such as ions, electrons, or holes are smoothly movable or a polymer having a porous structure such as an inorganic material, an organic material, an organic-inorganic composition, or an oligomer. The upper protection layer 520 may prevent a damage of the upper electrode 220 or the upper buffer layer 420 owing to a direct contact between the upper electrode 220 and the electrolyte layer 600, or between the upper buffer layer 420 and the electrolyte layer 600.

The upper buffer layer 420 may be a thin film having a function of adjusting an amount of ions moving from the electrolyte layer 600 to the upper ion reactive layer 320. As an example, the upper buffer layer 420 may include graphene having a single layer structure or a multi-layer structure. A stable discoloration operation of the electrochromic device 2 may become enabled by the adjustment of the amount of ions of the upper buffer layer 420.

The electrochromic device 2 may be discolored under the same condition as those in FIGS. 2A and 2B. For example, when the upper ion reactive layer 320 includes a reduction coloring material, the electrochromic device 2 may become colored or dark under the same voltage condition as FIG. 2A, and decolorized or transparent under the same voltage condition as FIG. 2B. As another example, when the upper ion reactive layer 320 includes an oxidation coloring material, the electrochromic device 2 may become decolorized or transparent under the same voltage condition as FIG. 2A, and may become colored or dark under the same voltage condition as FIG. 2B.

<Another Example of an Electrochromic Device>

Figure 4:
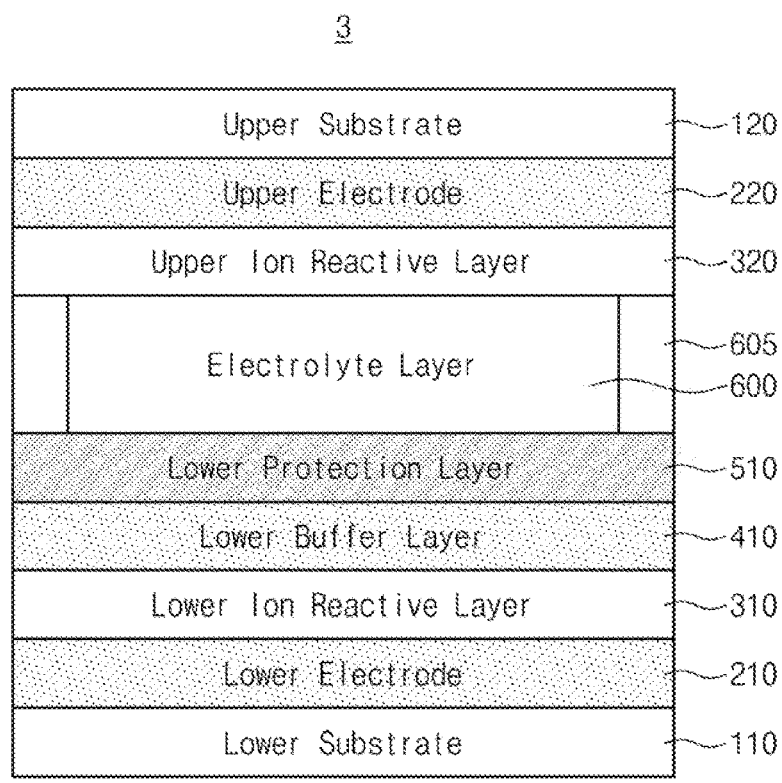
FIG. 4 is a cross-sectional view of an electrochromic device according to another embodiment of the inventive concept.

FIG. 4 is a cross-sectional view of an electrochromic device according to another embodiment of the inventive concept. Hereinafter, since the device of FIG. 4 is similar to that of FIG. 1, the same points will be omitted or briefly explained, or differences will be explained in detail.

Referring to FIG, 4, identically or similarly to the electrochromic device 1 of FIG. 1, the electrochromic device 3 may include the lower electrode 210 and the lower protection layer 510 between the electrolyte layer 600 and the lower substrate 110, and may include the upper electrode 220 and the upper ion reactive layer 320 between the electrolyte layer 600 and the upper substrate 120.

The electrochromic device 3 may further include at least any one of a lower ion reactive layer 310 and the lower buffer layer 410 between the lower electrode 210 and the lower protection layer 510. Identically or similarly to the upper buffer layer 420 of the electrochromic device 2 of FIG. 3, the lower buffer layer 410 may include graphene having, for example, a single structure or multi-layer structure capable of having a function of adjusting an amount of ions moved from the electrolyte layer 600.

The lower ion reactive layer 310 may include an oxidation coloring material or reduction coloring material, which is opposite to the upper ion reactive layer 320. For example, any one of the lower ion reactive layer 310 and the upper ion reactive layer 320 may include a reduction coloring material, and the other may include an oxidation coloring material. When an electric potential difference occurs between the lower electrode 210 and the upper electrode 220, any one of an oxidation reaction or a reduction reaction occurs in the lower ion reactive layer 310 and the other occurs in the upper ion reactive layer 320, which results discoloration of the electrochromic device 3.

<Operation Example of an Electrochromic Device>

Figure 5A:
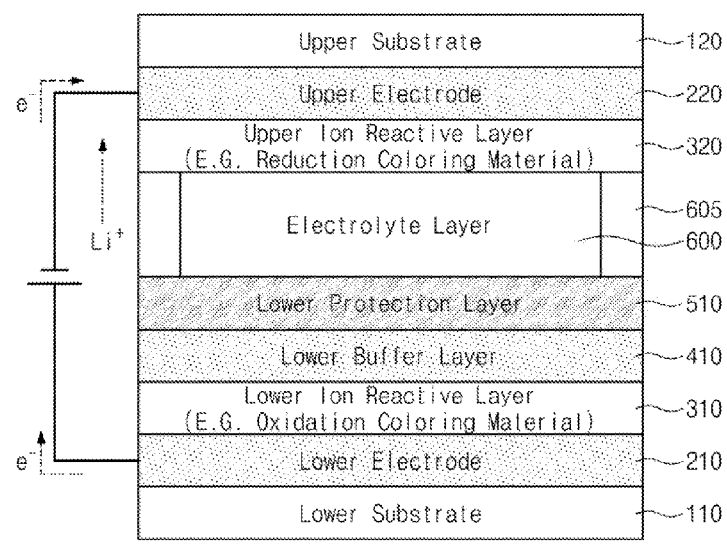
FIG. 5A is a cross-sectional view of a coloring operation of the electrochromic device of FIG. 4.
Figure 5B:
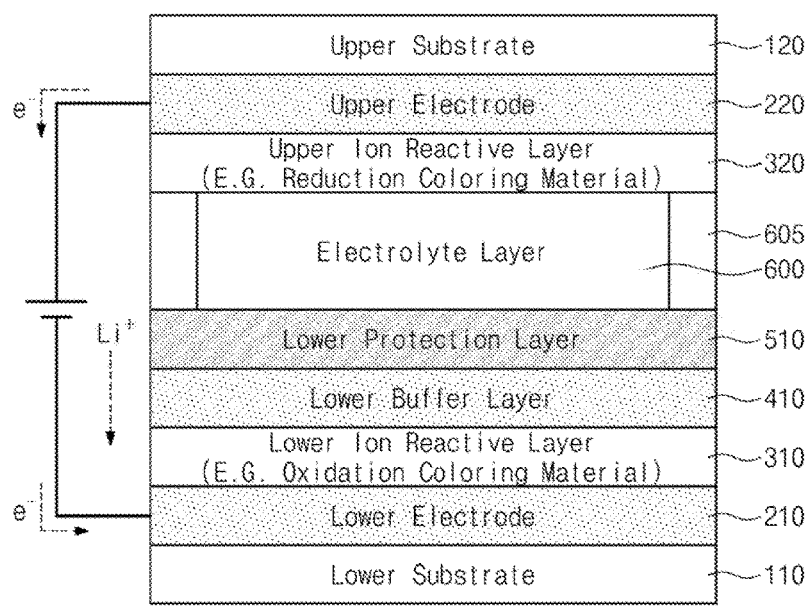
FIG. 5B is a cross-sectional view of a decolorizing operation of the electrochromic device of FIG. 4.

FIG. 5A is a cross-sectional view of a coloring operation of the electrochromic device of FIG. 4. FIG. 5B is a cross-sectional view of a decolorizing operation of the electrochromic device of FIG. 4.

Referring to FIG. 5A, when the upper ion reactive layer 320 of the electrochromic device 3 includes a reduction coloring material (e.g. viologen, viologen-anchored $TiO_2$) and the lower ion reactive layer 310 includes an oxidation coloring material (e.g. $SnO_2$ or Sb-doped $SnO_2$), and when an electric potential difference is applied between the upper electrode 220 and the lower electrode 210, the electrochromic device 3 may become colored or dark. For example, when a first voltage (e.g. a positive voltage) is applied to the lower electrode 210 and a second voltage (e.g. a negative voltage) lower than the first voltage is applied to the upper electrode 220, a reduction reaction may occur in the upper ion reaction layer 320 and an oxidation reaction may occur in the lower ion reactive layer 310. The electrochromic device 3 may represent a specific color due to the oxidation-reduction reaction.

Referring to FIG. 5B, when a first voltage (e.g. a positive voltage) is applied to the upper electrode 220 of the electrochromic device 3 in the colored state and a second voltage (e.g. a negative voltage) smaller than the first voltage is applied to the lower electrode 210, an oxidation reaction may occur in the upper ion reaction layer 320 and a reduction reaction may occur in the lower ion reaction layer 310. The electrochromic device 3 may become decolorized or transparent by the oxidation-reaction reaction.

As another example, the upper ion reactive layer 320 may include an oxidation coloring material and the lower ion reactive layer 310 may include a reduction coloring material. In this case, the electrochromic device 3 may become decolorized or transparent under the voltage application condition as illustrated in FIG. 5A, and become colored or dark under the voltage application condition as illustrated in FIG. 5B.

<Another Example of an Electrochromic Device>

Figure 6:
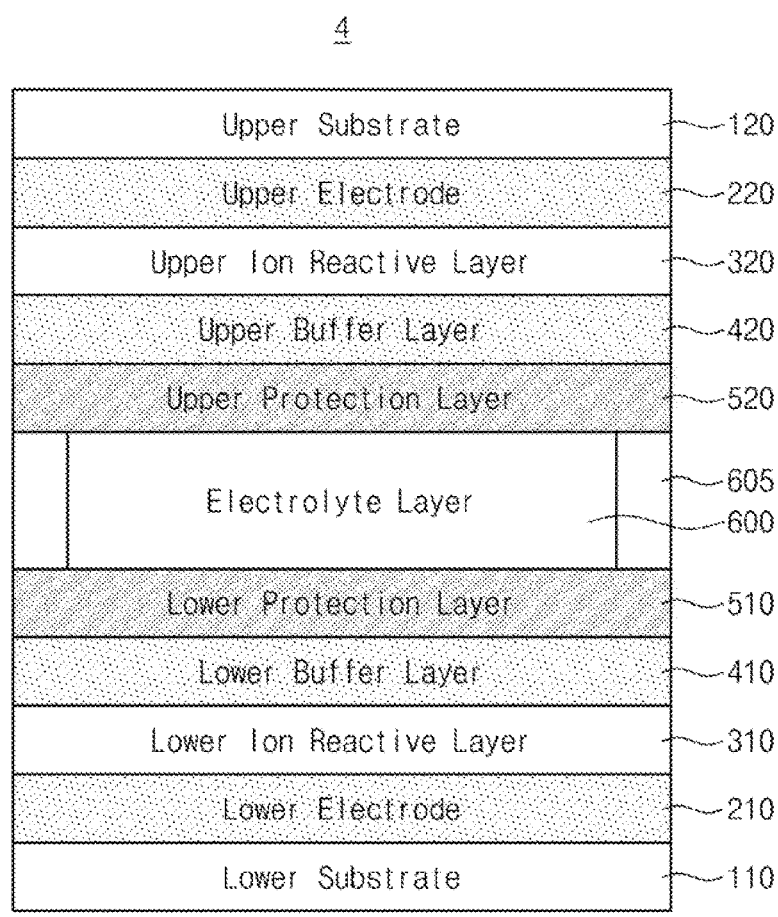
FIG. 6 is a cross-sectional view of an electrochromic device according to another embodiment of the inventive concept.

FIG. 6 is a cross-sectional view of an electrochromic device according to another embodiment of the inventive concept. Hereinafter, since the device of FIG. 6 is similar to that of FIG. 1, the same points will be omitted or briefly explained, or differences will be explained in detail.

Referring to FIG. 6, identically or similarly to the electrochromic device 1 of FIG. 1, the electrochromic device 4 may include the lower electrode 210 and the lower protection layer 510 between the electrolyte layer 600 and the lower substrate 110, and include the upper electrode 220 and the upper ion reactive layer 320 between the electrolyte layer 600 and the upper substrate 120.

The electrochromic device 4 may further include the lower ion reactive layer 310 and the lower buffer layer 410 provided between the lower electrode 210 and the lower protection layer 510 and may further include the upper buffer layer 420 and the upper protection layer 520 provided between the electrolyte layer 600 and the upper ion reactive layer 320.

The electrochromic device 4 may have a mirror image structure, which is up-and-down symmetrical with the electrolyte layer 600 intervened. For example, the lower electrode 210, the lower ion reactive layer 310, the lower buffer layer 410, and the lower protection layer 510 may be sequentially stacked on the lower substrate 110 along a direction from the lower substrate 110 toward the electrolyte layer 600. For example, the upper electrode 220, the upper ion reactive layer 320, the upper buffer layer 420, and the upper protection layer 520 may be sequentially stacked on the upper substrate 120 along a direction from the upper substrate 120 toward the electrolyte layer 600.

The electrochromic device 4 may be discolored under the same condition as those in FIGS. 5A and 5B. For example, when the upper ion reactive layer 320 includes a reduction coloring material and the lower ion reactive layer 310 includes an oxidation coloring material, the electrochromic device 4 may become colored or dark under the same voltage condition as FIG. 5A, and decolorized or transparent under the same voltage condition as FIG. 5B. As another example, when the upper ion reactive layer 320 includes an oxidation coloring material and the lower ion reactive layer 310 includes a reduction coloring material, the electrochromic device 4 may become decolorized or transparent under the same voltage condition as FIG. 5A, and colored or dark under the same voltage condition as FIG. 5B.

According to the inventive concept, a protection film may be provided between an electrode and an electrolyte to prevent a damage of the electrode according to a contact between the electrode and the electrolyte. Accordingly, an electrochromic device having a stable and reliable characteristic may be realized.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An electrochromic device comprising:
   a lower substrate and an upper substrate configured to face each other with an electrolyte layer therebetween;
   an upper electrode provided between the electrolyte layer and the upper substrate;
   a lower electrode provided between the electrolyte layer and the lower substrate;
   an upper ion reactive layer provided between the upper electrode and the electrolyte layer; and a lower protection layer provided between the lower electrode and the electrolyte layer and configured to prohibit the lower electrode and the electrolyte layer from contacting,
wherein the lower protection layer comprises a porous or membrane structure through which charges are movable between the electrolyte and the lower electrode.

2. The electrochromic device of claim 1, wherein the lower protection layer comprises an inorganic material, an organic material, an oligomer, or a polymer.

3. The electrochromic device of claim 1, further comprising at least any one of an upper buffer layer and an upper protection layer provided between the upper ion reactive layer and the electrolyte layer.

4. The electrochromic device of claim 3, wherein the upper protection layer is adjacent to the electrolyte layer and the upper buffer layer is provided between the upper ion reactive layer and the upper protection layer.

5. The electrochromic device of claim 3, wherein the upper protection layer comprises a porous or membrane structure through which charges are movable between the electrolyte layer and the upper electrode.

6. The electrochromic device of claim 3, wherein the upper buffer layer comprises graphene having a single layer or multi-layer structure.

7. The electrochromic device of claim 1, further comprising at least any one of a lower buffer layer and a lower ion reactive layer provided between the lower electrode and the lower protection layer.

8. The electrochromic device of claim 7, wherein the lower ion reactive layer is provided on the lower substrate and the lower buffer layer is provided between the lower ion reactive layer and the lower protection layer.

9. The electrochromic device of claim 8, wherein the lower buffer layer comprises graphene having a single layer or multi-layer structure.

10. The electrochromic device of claim 1, further comprising:
at least any one of an upper buffer layer and an upper protection layer provided between the upper ion reactive layer and the electrolyte layer; and
at least any one of a lower buffer layer and a lower ion reactive layer provided between the lower electrode and the lower protection layer.

11. An electrochromic device comprising:
an upper transparent substrate and lower transparent substrate facing each other;
an electrolyte layer provided between the upper transparent substrate and the lower transparent substrate;
a lower graphene electrode provided between the electrolyte layer and the lower transparent substrate;
an upper graphene electrode provided between the electrolyte layer and the upper transparent substrate;
an upper ion reactive layer provided between the upper graphene electrode and the electrolyte layer; and
a lower protection layer provided between the lower graphene electrode and the electrolyte layer and configured to separate the lower graphene electrode from the electrolyte layer,
wherein the lower protection layer comprises a porous or membrane structure through which charges are movable between the electrolyte layer and the lower graphene electrode.

12. The electrochromic device of claim 11, further comprising:
an upper buffer layer and an upper protection layer provided between the electrolyte layer and the upper transparent substrate,
wherein the upper buffer layer is provided between the electrolyte layer and the upper ion reactive layer, and the upper protection layer is provided between the electrolyte layer and the upper buffer layer.

13. The electrochromic device of claim 11, further comprising:
a lower buffer layer and a lower ion reactive layer provided between the electrolyte layer and the lower transparent substrate,
wherein the lower buffer layer is provided between the electrolyte layer and the lower ion reactive layer and the lower ion reactive layer is provided between the lower buffer layer and the lower transparent substrate.

14. The electrochromic device of claim 11, further comprising:
an upper buffer layer and an upper protection layer provided between the upper ion reactive layer and the electrolyte layer; and
a lower buffer layer and a lower ion reactive layer provided between the lower graphene electrode and the lower protection layer.

15. The electrochromic device of claim 14, wherein the lower graphene electrode, the lower ion reactive layer, the lower buffer layer, and the lower protection layer are sequentially stacked on the lower transparent substrate along a direction from the lower transparent substrate toward the electrolyte layer, and
wherein the upper graphene electrode, the upper ion reactive layer, the upper buffer layer, and the upper protection layer are sequentially stacked on the upper transparent substrate along a direction from the upper transparent substrate toward the electrolyte layer.

16. An electrochromic device comprising:
lower and upper transparent substrates configured to face each other with an electrolyte layer therebetween;
a lower transparent electrode provided on the lower transparent substrate;
an upper transparent electrode provided on the upper transparent substrate;
an upper ion reactive layer provided on the upper transparent electrode and adjacent to the electrolyte layer; and
a lower protection layer provided on the lower transparent electrode and adjacent to the electrolyte layer,
wherein the lower protection layer comprises a porous membrane provided between the lower transparent electrode and the electrolyte layer and configured to separate the lower transparent electrode from the electrolyte layer.

17. The electrochromic device of claim 16, further comprising:
an upper buffer layer and an upper protection layer provided between the lower transparent substrate and the electrolyte layer,
wherein the upper protection layer comprises a porous membrane provided between the upper buffer layer and the electrolyte layer, and
the upper buffer layer comprises graphene provided between the upper protection layer and the upper ion reactive layer.

18. The electrochromic device of claim 16, further comprising:
- a lower buffer layer and a lower ion reactive layer provided between the lower transparent substrate and the electrolyte layer,
- wherein the lower protection layer comprises a porous membrane provided between the lower buffer layer and the electrolyte layer, and
- the lower ion reactive layer is provided between the lower protection layer and the lower transparent substrate.

19. The electrochromic device of claim 16, further comprising:
- an upper buffer layer and an upper protection layer provided between the upper transparent layer and the electrolyte layer; and
- a lower buffer layer and a lower ion reactive layer provided between the lower transparent substrate and the electrolyte layer,
- wherein the upper protection layer comprises a porous membrane provided between the upper buffer layer and the electrolyte layer and the upper buffer layer comprises graphene provided between the upper protection layer and the upper ion reactive layer, and
- wherein the lower protection layer comprises a porous membrane provided between the lower buffer layer and the electrolyte layer, and the lower ion reactive layer is provided between the lower protection layer and the lower transparent substrate.

\* \* \* \* \*